United States Patent
Yoshihara (10) Patent No.: US 7,265,810 B2
(45) Date of Patent: Sep. 4, 2007

(54) LIQUID CRYSTAL DISPLAY DEVICE AND MANUFACTURING METHOD OF LIQUID CRYSTAL DISPLAY DEVICE

(75) Inventor: Toshiaki Yoshihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 39 days.

(21) Appl. No.: 10/621,505

(22) Filed: Jul. 17, 2003

(65) Prior Publication Data

US 2004/0041974 A1    Mar. 4, 2004

(30) Foreign Application Priority Data

Aug. 30, 2002   (JP)   ............................. 2002-255794

(51) Int. Cl.
  *C09K 19/02*   (2006.01)
(52) U.S. Cl. .................. 349/172; 349/175; 349/188
(58) Field of Classification Search ................ 349/168, 349/175, 177, 172, 174, 184–186, 188, 123, 349/65
   See application file for complete search history.

(56) References Cited

U.S. PATENT DOCUMENTS

| 4,969,719 | A | * | 11/1990 | Bradshaw et al. | ........... 349/116 |
| 5,061,047 | A | * | 10/1991 | Bradshaw et al. | ........... 349/172 |
| 5,746,939 | A | * | 5/1998 | Taniguchi et al. | ..... 252/299.01 |
| 6,791,527 | B2 | * | 9/2004 | Yoshinaga et al. | ........... 345/102 |
| 2002/0018171 | A1 | * | 2/2002 | Asao et al. | .................. 349/172 |

FOREIGN PATENT DOCUMENTS

JP    2000-275685    * 10/2000

* cited by examiner

Primary Examiner—Thoi V. Duong
(74) Attorney, Agent, or Firm—Greer, Burns & Crain, Ltd.

(57) ABSTRACT

The present invention provides a liquid crystal display device having uniform alignment of monostable ferroelectric liquid crystal, and a manufacturing method of the liquid crystal display device. The temperature range of a cholesteric phase or a chiral nematic phase of the phase sequence of the liquid crystal has a temperature width of not less than 3° C. After heating the liquid crystal to an isotropic phase once, the liquid crystal is cooled to room temperature (25° C.) at a cooling rate of 3, 5, 10° C./minute. An alignment treatment is performed by application of a DC voltage of not lower than 3 V, which is a sufficient voltage to obtain the effects of the alignment treatment, within a temperature range of ±3° C. from transition temperature at which the liquid crystal changes from the cholesteric phase to the chiral smectic C phase.

10 Claims, 8 Drawing Sheets
(2 of 8 Drawing Sheet(s) Filed in Color)

| CHOLESTERIC PHASE TEMPERATURE WIDTH (°C) | COOLING RATE (°C/min.) | | | |
|:---:|:---:|:---:|:---:|:---:|
| | 1 | 3 | 5 | 10 |
| 2 | X | X | X | X |
| 3 | O | O | X | X |
| 5 | O | O | O | X |
| 7 | O | O | O | X |
| 10 | O | O | O | O |
| 18 | O | O | O | O |
| 24 | O | O | O | O |

O : GOOD ALIGNMENT
X : POOR ALIGNMENT

FIG. 1

| SAMPLE NAME | CHOLESTERIC PHASE | | SPONTANEOUS POLARIZATION VALUE (nC/cm$^2$) |
|---|---|---|---|
| | TEMPERATURE RANGE (°C) | TEMPERATURE WIDTH (°C) | |
| A | 95~93 | 2 | 5 |
| B | 67~64 | 3 | 7 |
| C | 101~96 | 5 | 10 |
| D | 71~64 | 7 | 6 |
| E | 99~89 | 10 | 7 |
| F | 115~97 | 18 | 11 |
| G | 99~75 | 24 | 8 |

FIG. 2

| CHOLESTERIC PHASE TEMPERATURE WIDTH (°C) | COOLING RATE (°C/min.) | | | |
|---|---|---|---|---|
| | 1 | 3 | 5 | 10 |
| 2 | × | × | × | × |
| 3 | ○ | ○ | × | × |
| 5 | ○ | ○ | ○ | × |
| 7 | ○ | ○ | ○ | × |
| 10 | ○ | ○ | ○ | ○ |
| 18 | ○ | ○ | ○ | ○ |
| 24 | ○ | ○ | ○ | ○ |

○ : GOOD ALIGNMENT
× : POOR ALIGNMENT

| APPLIED VOLTAGE (V) | ALIGNMENT STATE GOOD·POOR |
|---|---|
| 1 | POOR |
| 2 | POOR |
| 3 | GOOD |
| 5 | GOOD |
| 10 | GOOD |

LIQUID CRYSTAL DISPLAY DEVICE AND MANUFACTURING METHOD OF LIQUID CRYSTAL DISPLAY DEVICE

BACKGROUND OF THE INVENTION

The present invention relates to a liquid crystal display device and a manufacturing method of the liquid crystal display device, and more particularly relates to a liquid crystal display device using a liquid crystal having spontaneous polarization and a manufacturing method of the liquid crystal display device.

DESCRIPTION OF THE RELATED ART

Along with the development of information-oriented society, small electronic apparatuses and mobile electronic apparatuses have been used. Accordingly, there is a demand for a small-size, light-weight, low-power consuming display unit for such electronic apparatuses, and then liquid crystal display devices that have superior characteristics compared to other display devices are in wide use.

The liquid crystal display devices are mainly classified into a transmission type and a reflection type. Transmission type liquid crystal display devices using a back-light are more widely adopted from the viewpoint of visibility, and color liquid crystal display devices using color filters are the mainstream.

As a color liquid crystal display device, a TN (Twisted Nematic) type using a switching element such as a TFT (Thin Film Transistor) is in wide use. Although a TFT-driven TN-type color liquid crystal display device has high display quality, the liquid crystal panel has a low transmittance of around 4%. In order to achieve high display screen brightness, a high intensity back-light is necessary, and therefore the consumption of power increases. Besides, since a color display is realized using color filters, a single pixel needs to be composed of three sub-pixels, and thus a high-definition display is difficult to be achieved and the displayed colors do not have sufficient purity. In order to solve these problems, a color liquid crystal display device based on a field-sequential color scheme was proposed.

Since a color liquid crystal display device based on the field-sequential color scheme does not require sub-pixels, a higher definition display can be realized easily compared to a color liquid crystal display device using the color-filter scheme. Moreover, since this device does not use color filters, the color of light emitted by the light source can be used as it is for display, and the displayed colors have excellent purity. Furthermore, since the light utilization efficiency is high, this device has the characteristic of low power consumption. However, in order to realize a color liquid crystal display device based on the field-sequential color scheme, the liquid crystal must provide high-speed response.

In order to realize a high-speed response color liquid crystal display device, the present inventor et al. are performing research on the methods for driving liquid crystals having spontaneous polarization by TFTs, etc. which may achieve 100 to 1000 times higher response speed compared to conventional methods. A liquid crystal having spontaneous polarization, particularly a ferroelectric liquid crystal, has a characteristic that the long-axis direction of the liquid crystal molecule is changed by the application of an electric field. Accordingly, it is possible to provide a display by sandwiching a liquid crystal panel using a ferroelectric liquid crystal between two polarization plates whose polarization axes cross each other at right angles and using birefringence caused by the change in the long-axis direction of the liquid crystal molecules.

The driving of the liquid crystal by the TFTs can be achieved using either a bistable type or monostable type ferroelectric liquid crystal. In the monostable type in which the average molecular axis of a director of the liquid crystal molecules (tilted direction of the liquid crystal molecules) of the liquid crystal is aligned in a single direction when no voltage is applied, it is particularly important to obtain a monostable state showing uniform alignment of the liquid crystal.

Figure 8A:
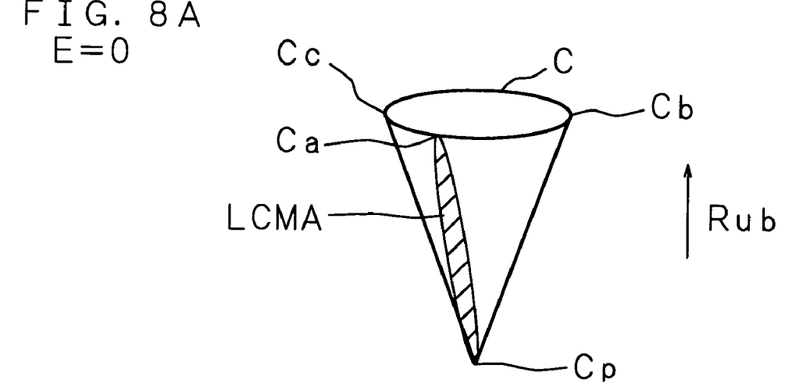
FIG. 8A is a concept view showing a tilted state of a monostable ferroelectric liquid crystal (electric field E=0)
Figure 8B:
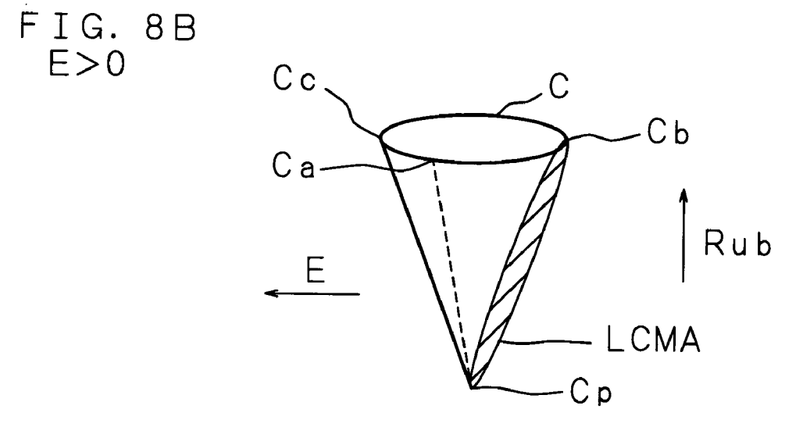
FIG. 8B is a concept view showing a tilted state of the monostable ferroelectric liquid crystal (electric field E>0)
Figure 8C:
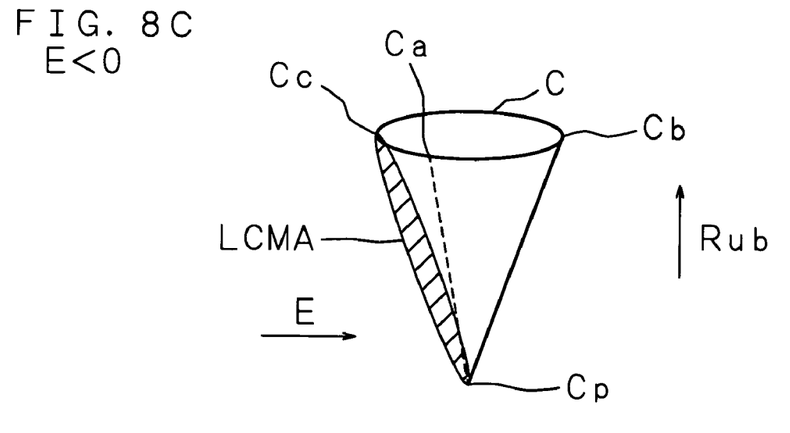
FIG. 8C is a concept view showing a tilted state of the monostable ferroelectric liquid crystal (electric field E<0).

FIGS. 8A through 8C are concept views showing the tilted states of a monostable ferroelectric liquid crystal. FIG. 8A shows a state obtained when the electric field E applied to the liquid crystal is equal to zero, i.e., when no voltage is applied; FIG. 8B shows a state when the electric field E applied to the liquid crystal is greater than zero, i.e., when a voltage of a first polarity is applied; and FIG. 8C shows a state when the electric field E applied to the liquid crystal is less than zero, i.e., when a voltage of a second polarity opposite to the voltage of the first polarity is applied. The arrow Rub indicates the rubbing direction of an alignment film (not shown), and an average molecular axis LCMA of a liquid crystal molecular director is aligned along the ridgeline of a cone C having a base in the Rub direction. One end of the average molecular axis LCMA is positioned on the cone point Cp of the cone C, and the (other end of) average molecular axis LCMA rotates along the ridgeline of the cone C. In other words, when no voltage is applied (FIG. 8A), the liquid crystal shows a monostable state in which the average molecular axis LCMA is aligned in a single direction (for example, a direction defined by one point Ca on the outer circumference of the base of the cone C and the cone point Cp in the figures) and present in a first position. When a voltage of the first polarity is applied (FIG. 8B), the liquid crystal shows a state in which the average molecular axis LCMA is tilted from the position (first position) of the monostable state in one direction (for example, a direction defined by one point Cb on the outer circumference of the base of the cone C and the cone point Cp in the figures) at an angle corresponding to the magnitude of the voltage of the first polarity and present in a second position. When a voltage of a second polarity opposite to the first polarity is applied (FIG. 8C), the liquid crystal shows either a state in which the average molecular axis LCMA maintains the position (first position) of the monostable state or a state in which it is tilted from the position (first position) of the monostable state in a direction opposite to the above one direction (for example, in a direction defined by one point Cc on the outer circumference of the base of the cone C and the cone point Cp in the figures) and present in a third position.

In a monostable ferroelectric liquid crystal, in general, by only introducing the liquid crystal into an empty liquid crystal panel, it is impossible to obtain uniform alignment of the liquid crystal in a chiral smectic C phase which is used in display. The reason for this is that, in the chiral smectic C phase, the average molecular axis LCMA can have two states of different directions. Therefore, in general, by applying a DC voltage at temperatures including a transition point from the cholesteric phase (or chiral nematic phase) to the chiral smectic C phase to align the direction of spontaneous polarization by the electric field and align the direction of the average molecular axis LCMA, uniform alignment is realized. The application of an electric field to the liquid crystal during a cooling process to obtain a monostable state is hereinafter referred to as "alignment treatment".

However, the conventional alignment treatment suffers from a problem that uniform alignment of the liquid crystal can not be obtained despite the application of the DC voltage. It is considered that this problem is caused by other factors that dominate the alignment state of the liquid crystal.

As relevant prior art references, there are "AM-LCD", Yoshihara et al., '99 Digest of Technical Papers, p185 (1999); and "SID", Yoshihara et al., '00 Digest of Technical Papers, p1176 (2000).

SUMMARY OF THE INVENTION

The present invention has been made with the aim of solving the above problems, and it is an object of the present invention to provide a liquid crystal display device having uniform alignment of the liquid crystal by specifying a temperature range of the cholesteric phase (or chiral nematic phase) of the phase sequence of a monostable liquid crystal having spontaneous polarization, particularly a ferroelectric liquid crystal.

Another object of the present invention is to provide a manufacturing method of a liquid crystal display device, for realizing uniform alignment of liquid crystal by specifying correlations between the temperature range of the cholesteric phase (or chiral nematic phase) of the phase sequence of liquid crystal and the cooling rate in the alignment treatment and magnitude of a DC voltage in the alignment treatment, for the alignment treatment of a monostable liquid crystal having spontaneous polarization, particularly a ferroelectric liquid crystal.

Still another object of the present invention is to provide a liquid crystal display device capable of providing a higher quality display by driving a liquid crystal display device having uniform alignment of liquid crystal by a field-sequential color scheme.

A liquid crystal display device of the present invention comprises two substrates sandwiching a liquid crystal having spontaneous polarization, and electrodes for applying a voltage to the liquid crystal. In the liquid crystal display device of the present invention, the liquid crystal shows a monostable state in which an average molecular axis of a director of liquid crystal molecules is aligned in a single direction and present in a first position when no voltage is applied, shows a state in which the average molecular axis is tilted in one direction from the first position at an angle corresponding to the magnitude of a voltage of a first polarity and present in a second position when the voltage of the first polarity is applied, and shows either a state in which the average molecular axis maintains the first position or a state in which the average molecular axis is tilted in a direction opposite to the one direction from the first position and present in a third position when a voltage of a second polarity opposite to the voltage of the first polarity is applied, and a temperature range of either one of a cholesteric phase and a chiral nematic phase of a phase sequence of the liquid crystal has a temperature width of not less than 3° C.

In the liquid crystal display device of the present invention, the temperature range of either one of the cholesteric phase and the chiral nematic phase has a temperature width of preferably not less than 5° C., more preferably not less than 10° C. In the liquid crystal display device of the present invention, the liquid crystal is preferably a ferroelectric liquid crystal. The liquid crystal display device according to the present invention preferably further comprises a backlight which is driven by a field-sequential color scheme, and a data-writing scanning voltage and a data-erasure scanning voltage are applied to the electrodes.

A manufacturing method of a liquid crystal display device of the present invention is a manufacturing method of a liquid crystal display device comprising two substrates sandwiching a liquid crystal having spontaneous polarization, and electrodes for applying a voltage to the liquid crystal, wherein the liquid crystal shows a monostable state in which an average molecular axis of a director of liquid crystal molecules is aligned in a single direction and present in a first position when no voltage is applied, shows a state in which the average molecular axis is tilted in one direction from the first position at an angle corresponding to a magnitude of a voltage of a first polarity and present in a second position when the voltage of the first polarity is applied, and shows either a state in which the average molecular axis maintains the first position or a state in which the average molecular axis is tilted in a direction opposite to the one direction from the first position and present in a third position when a voltage of a second polarity opposite to the voltage of the first polarity is applied, and a temperature range of either one of a cholesteric phase and a chiral nematic phase of a phase sequence of the liquid crystal has a temperature width of not less than 3° C., and the manufacturing method preferably comprises the steps of: introducing the liquid crystal between the two substrates; and performing an alignment treatment to bring the liquid crystal into the monostable state by cooling the liquid crystal at a cooling rate of not more than 3° C./minute after heating the liquid crystal.

The manufacturing method of a liquid crystal display device according to the present invention preferably comprises the steps of introducing the liquid crystal between the two substrates; and performing an alignment treatment to bring the liquid crystal into the monostable state by applying a DC voltage of not lower than 3 V between the electrodes after heating the liquid crystal. The manufacturing method of a liquid crystal display device according to the present invention preferably comprises the steps of introducing the liquid crystal between the two substrates; and performing an alignment treatment to bring the liquid crystal into the monostable state by causing a cooling rate when a DC voltage is applied between the electrodes to be lower than a cooling rate when no voltage is applied, after heating the liquid crystal. The manufacturing method of a liquid crystal display device according to the present invention preferably comprises the steps of introducing the liquid crystal between the two substrates; and performing an alignment treatment to bring the liquid crystal into the monostable state by providing a period in which the temperature of the liquid crystal during cooling is kept within a temperature range showing either one of the cholesteric phase and the chiral nematic phase, after heating the liquid crystal. In the manufacturing method of a liquid crystal display device according to the present invention, the alignment treatment is preferably performed after heating the liquid crystal to an isotropic phase.

According to the present invention, the liquid crystal has spontaneous polarization, shows a monostable state in which the average molecular axis of a director of liquid crystal molecules is present in a first position when no voltage is applied, shows a state in which the average molecular axis is tilted in one direction from the first position and present in a second position when a voltage of a first polarity is applied, and shows either a state in which the average molecular axis maintains the first position or a state in which the average molecular axis is tilted in a direction opposite to the one direction from the first position and present in a third position when a voltage of a second polarity is applied. In the present invention, since the temperature range of either one of the cholesteric phase and the chiral nematic phase of the phase sequence of the liquid crystal has a temperature width of not less than 3° C., preferably not less than 5° C., and more preferably not less than 10° C., and since the present invention preferably uses a ferroelectric liquid crystal, it is possible to achieve uniform alignment of the liquid crystal by the alignment treatment and obtain a monostable state of higher uniformity, thereby providing a liquid crystal display device of high display quality.

According to the present invention, the liquid crystal display device further comprises a back-light which is driven by a field-sequential color scheme, and a data-writing scanning voltage and a data-erasure scanning voltage are applied to the electrodes, and thus it is possible to provide a liquid crystal display device that enables high-definition, high-speed response and high color purity color display.

In the present invention, when performing an alignment treatment for aligning the liquid crystal into the monostable state, the alignment is performed at a cooling rate of not more than 3° C./minute. In the present invention, the alignment treatment is performed by applying a DC voltage of not less than 3 V to the liquid crystal. In the present invention, the alignment treatment is performed by causing a cooling rate when the DC voltage is applied to be lower than a cooling rate when no voltage is applied. In the present invention, the alignment treatment is performed by providing a period in which the temperature of the liquid crystal during cooling is kept within a temperature range of the cholesteric phase (or chiral nematic phase). Accordingly, the present invention enables stable and highly uniform alignment treatment. In the present invention, since the liquid crystal is cooled after heating it to the isotropic phase, it is possible to start cooling from the cholesteric phase (or chiral nematic phase), thereby enabling more stable and highly uniform alignment treatment.

The above and further objects and features of the invention will more fully be apparent from the following detailed description with accompanying drawings.

BRIEF DESCRIPTION OF THE DRAWINGS

The file of this patent contains three (3) color photographs. Copies of this patent with color photographs will be provided by the Patent and Trademark Office upon request and payment of the necessary fee.

DETAILED DESCRIPTION OF THE PREFERRED EMBODIMENTS

The following description will explain the present invention in detail, based on the drawings illustrating some embodiments thereof

[Characteristics of Liquid Crystal Samples]

Figure 1:
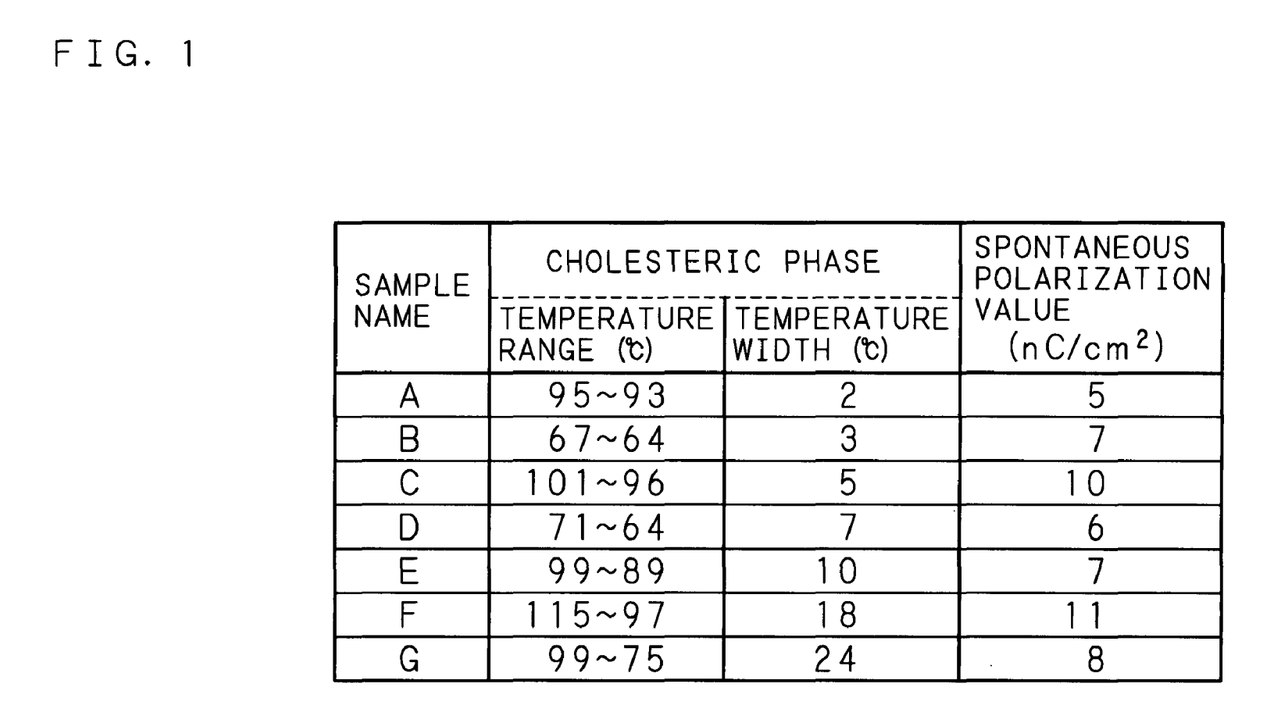
FIG. 1 is a characteristic table of liquid crystal samples used in the embodiments.

FIG. 1 is a characteristic table of liquid crystal samples used in the embodiments. The temperature range (° C.) of a cholesteric phase (or a chiral nematic phase), the temperature width (° C.) of the temperature range, and the spontaneous polarization value ($nC/cm^2$) at 30° C. are shown in association with each sample name of liquid crystals. The samples of liquid crystals are all monostable ferroelectric liquid crystals having spontaneous polarization, and the phase sequence is isotropic phase—cholesteric phase (or chiral nematic phase)—chiral smectic C phase in this order from the higher temperature side. The samples of liquid crystals are of seven kinds in which the temperature width of the temperature range of the cholesteric phase (or chiral nematic phase) is 2° C. (sample A), 3° C. (sample B), 5° C. (sample C), 7° C. (sample D), 10° C. (sample E), 18° C. (sample F), and 24° C. (sample G). The temperature range of the cholesteric phase is 95 to 93, 67 to 64, 101 to 96, 71 to 64, 99 to 89, 115 to 97, and 99 to 75° C. in this order from sample A to sample G. The spontaneous polarization value shows values within a range of 5 to 11 ($nC/cm^2$). Note that liquid crystals having such a phase sequence and temperature width of the temperature range of the cholesteric phase (or chiral nematic phase, hereinafter just referred to as the cholesteric phase) can be adjusted by suitably blending with various types of liquid crystals.

Embodiment 1

After washing a glass substrate having a transparent electrode with an electrode area of 1 $cm^2$ formed by ITO (Indium Tin Oxide), polyimide was applied to a glass substrate surface on which the transparent electrode was formed, and then baked for one hour under the condition of 200° C. to form an about 20 nm polyimide film. The surface of this polyimide film was rubbed with a rayon fabric, and then two glass substrates having the transparent electrodes were placed to face each other so that their rubbing directions were parallel (the rubbing directions were oriented in the same direction). A gap between the glass substrates when placed to face each other was maintained by spacers made of silica having an average particle size of 1.6 μm, and an empty cell for evaluation (evaluation empty cell) was produced. Note that the gap was about 1.7 to 1.8 μm or so in actual measurement.

Figure 2:
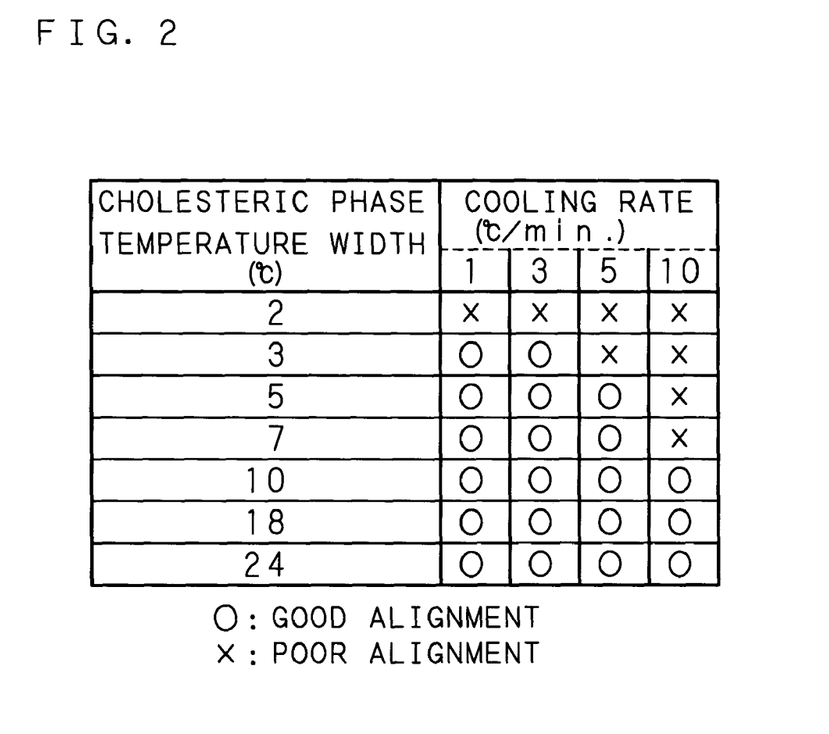
FIG. 2 is a characteristic table showing a correlation between the cooling rate in the alignment treatment and the alignment state.

FIG. 2 is a characteristic table showing a correlation between the cooling rate in an alignment treatment and the alignment state. Seven kinds of evaluation cells A to G were produced by introducing samples A to G of liquid crystals (liquid crystal materials) into evaluation empty cells, and the alignment state after the alignment treatment was observed for each cell. In this table, "good alignment" means that uniform alignment of the liquid crystal was confirmed by microscopic observation, while "poor alignment" means that uniform alignment of the liquid crystal was not confirmed by microscopic observation.

The cooling process of liquid crystal comprises cooling the liquid crystal to room temperature (25° C.) at four kinds of cooling rates (1, 3, 5, 10° C./minute) after heating the liquid crystal to the isotropic phase once. The alignment treatment was performed by application of a DC voltage of 3 V, which was a sufficient voltage to obtain the effects of the alignment treatment, within a temperature range of ±3° C. from transition temperature at which the liquid crystal changes from the cholesteric phase to the chiral smectic C phase. Note that the DC voltage of 3 V is about 1.7 to 1.8 V/μm or so when converted to electric field strength. It is also possible to specify an applied voltage in the alignment treatment by electric field strength. Moreover, since the alignment treatment is performed in the cooling process performed after heating the liquid crystal to the isotropic phase once, it is possible to realize the cooling process through the cholesteric phase with a great effect of the alignment treatment, thereby enabling more accurate and uniform alignment treatment.

When the temperature width of the cholesteric phase was 2° C. (in the case of evaluation cell A), poor alignment was observed at any cooling rate. When the temperature width of the cholesteric phase was 3° C. (in the case of evaluation cell B), good alignment was obtained at a cooling rate of not more than 3° C./minute, but poor alignment was observed at a cooling rate of 5 and 10° C./minute. When the temperature width of the cholesteric phase was 5 and 7° C. (in the case of evaluation cells C and D), good alignment was obtained at a cooling rate of not more than 5° C./minute, but poor alignment was observed at a cooling rate of 10° C./minute. When the temperature width of the cholesteric phase was 10, 18 and 24° C. (in the case of evaluation cells E, F and G), good alignment was obtained at any cooling rate.

It is understood from the results of observation with a microscope that, even when the cooling rate is increased, uniform alignment can be realized by increasing the temperature width of the cholesteric phase. In particular, when the temperature width of the cholesteric phase was 3° C. or more, uniform alignment was realized even at a cooling rate of 3° C./minute. It is also understood that by increasing the temperature width of the cholesteric phase to 5° C. and 10° C., it is possible to realize uniform alignment even at a higher cooling rate of 5° C./minute when the temperature width of the cholesteric phase is 5° C., or at a higher cooling rate of 10° C./minute when the temperature width of the cholesteric phase is 10° C. In short, it is possible to increase the cooling rate in the alignment treatment and shorten the time taken for the alignment treatment. Furthermore, by increasing the temperature width of the cholesteric phase to 5° C. or 10° C., it is possible to ensure a wide margin for variations in the temperature of the liquid crystal substrate in the alignment treatment, and realize stable alignment.

When the temperature width of the cholesteric phase was as narrow as 2° C., uniform alignment was not obtained by further decreasing the cooling rate to 1° C./minute. The reason for this is that, although the average molecular axis LCMA can be aligned along the rubbing direction in the cholesteric phase, an electric field is applied before the average molecular axis LCMA is sufficiently aligned along the rubbing direction due to the narrow temperature width of the cholesteric phase. In short, the direction of the average molecular axis is not aligned in a single direction, and uniform alignment is not obtained.

Figure 3A:
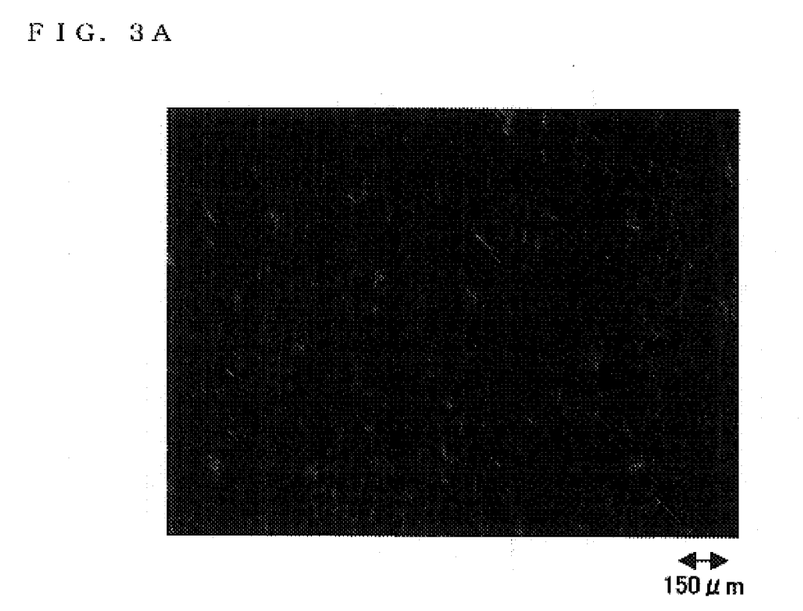
FIG. 3A is a photomicrograph of good alignment of FIG. 2.
Figure 3B:
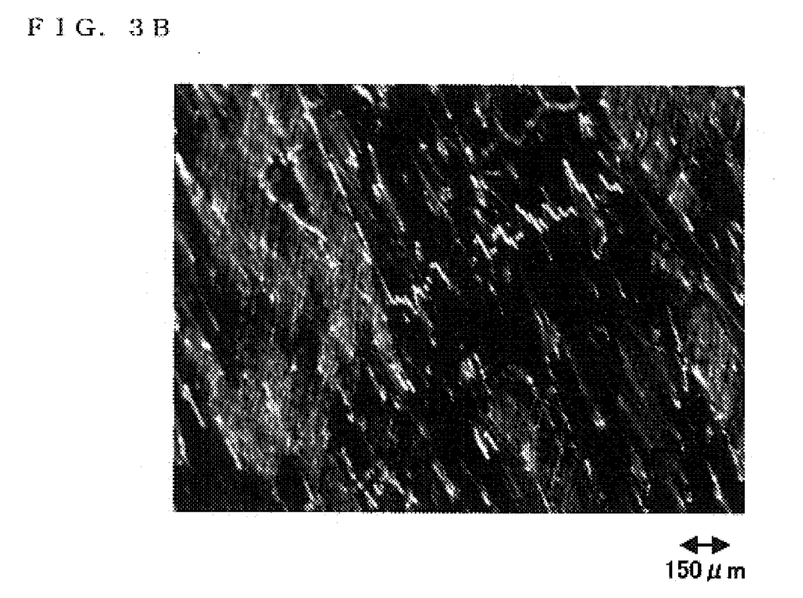
FIG. 3B is a photomicrograph of poor alignment of FIG. 2.

FIG. 3A and FIG. 3B are photomicrographs showing the alignment states of FIG. 2. FIG. 3A shows good alignment, and FIG. 3B shows poor alignment, both of which are the results of observation of the dark state. In other words, in FIG. 3A, since the uniformity of the observed image is high and a substantially uniform black background state is shown, it is apparent that the liquid crystal is in a state of uniform alignment, thus representing good alignment. Note that white minute dots slightly seen on the scattered dots are due to alignment defects caused by the spacers. On the other hand, FIG. 3B shows a state in which the uniformity of the observed image is low, countless white scratches are present on the black background, and domains with different directions of the average molecular axis LCMA are present. Hence, it is apparent that the liquid crystal is not in a state of uniform alignment, thus representing poor alignment.

For the reasons mentioned above, the temperature width showing the cholesteric phase is preferably 3° C. or more, and, if shortening of the alignment time is taken into consideration, the temperature width is preferably 5° C., and more preferably 10° C. Besides, it is apparent that, when the temperature width showing the cholesteric phase is 3° C. (and more than 3° C.), good alignment is obtainable if the cooling rate is not more than 3° C./minute. Therefore, even when the temperature width showing the cholesteric phase is relatively narrow 3° C., if the cooling rate is set at 3° C./minute or less, it is possible to enable stable alignment treatment. Further, if the response performance to the electric field is taken into consideration, it is more preferable to use a ferroelectric liquid crystal as the liquid crystal.

Embodiment 2

In Embodiment 2, an evaluation cell was produced by introducing the liquid crystal of sample F into an evaluation empty cell similar to that of Embodiment 1, and the alignment treatment was performed. The cooling process of liquid crystal comprises cooling the liquid crystal to room temperature (25° C.) at a fixed cooling rate of 3° C./minute after heating the liquid crystal to the isotropic phase (120° C.). The alignment treatment was performed by application of a DC voltage as an applied voltage to the liquid crystal by changing the magnitude of the DC voltage to 1, 2, 3, 5 and 10 V, within a temperature range of ±3° C. from transition temperature (97° C.) at which the phase of the liquid crystal changes from the cholesteric phase to the chiral smectic C phase.

Figure 4:
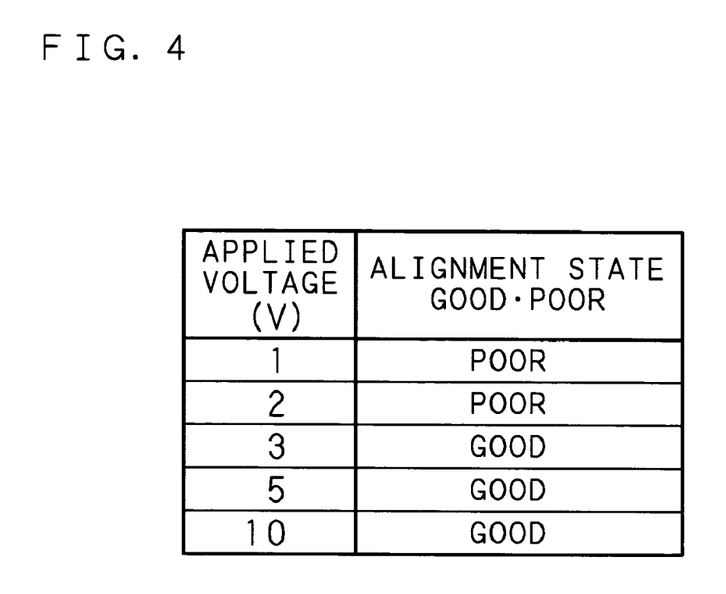
FIG. 4 is a characteristic table showing a correlation between the applied voltage in the alignment treatment and the alignment state.

FIG. 4 is a characteristic table showing a correlation between the applied voltage in the alignment treatment and the alignment state. This shows the applied voltage in the alignment treatment and the results of observation of good or poor alignment with a microscope after the alignment treatment. The criteria for the good and poor alignments are the same as in Embodiment 1. Poor alignment was observed when the applied voltage was 1 and 2 V, and good alignment was obtained when the applied voltage was 3, 5, and 10 V In short, the applied voltage in the alignment treatment is preferably no lower than 3 V By applying a voltage of not lower than 3 V, it is possible to ensure a sufficient response of the liquid crystal to the electric field, and obtain highly uniform alignment. The applied voltage is about 1.7 to 1.8 V/μm or so when converted to electric field strength. Note that since the upper limit of the applied voltage is determined by an breakdown voltage of the liquid crystal, it is not necessary to increase the applied voltage to be higher than the breakdown voltage.

Figure 5:
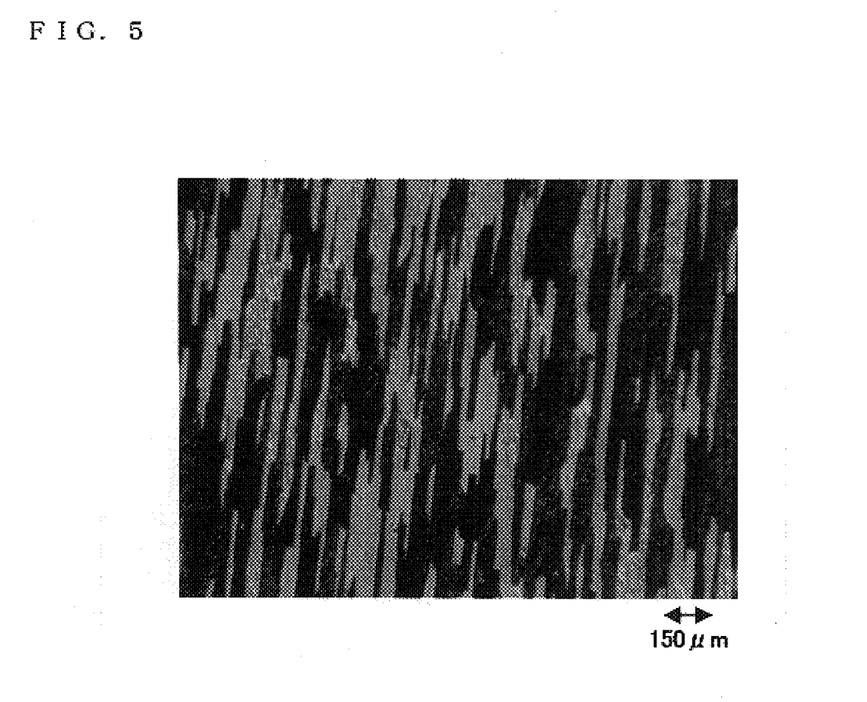
FIG. 5 is a photomicrograph of poor alignment of FIG. 4.

FIG. 5 is a photomicrograph showing poor alignment of FIG. 4. This shows the alignment state for the applied voltage of not more than 2 V of FIG. 4. Since the applied voltage was low, sufficient electric field strength was not obtained, and a sufficient response of the liquid crystal to the electric field could not be obtained (the direction of spontaneous polarization could not be aligned in a single direction by the electric field) in the alignment treatment. Moreover, since the cell was divided into two types of domains with different directions of average molecular axis LCMA, white and black spot patterns were observed, and thus it is apparent that the liquid crystal was not in a state of uniform alignment.

Embodiment 3

In Embodiment 3, an evaluation cell was produced by introducing the liquid crystal of sample E into an evaluation empty cell similar to that of Embodiment 1, and the alignment treatment was performed. The cooling process of liquid crystal comprises, after heating the liquid crystal to the isotropic phase (100° C.) once, cooling the liquid crystal to 95° C. at a cooling rate of 5° C./minute, then cooling the liquid crystal to 86° C. at a cooling rate of 1° C./minute, and further cooling the liquid crystal to room temperature (25° C.) at a cooling rate of 5° C./minute. The alignment treatment was performed by application of a DC voltage of 3 V as an applied voltage to the liquid crystal within a temperature range of ±3° C. from transition temperature (89° C.) at which the phase of the liquid crystal changes from the cholesteric phase to the chiral smectic C phase (92 to 86° C.). The obtained alignment state was uniform alignment similar to the alignment state obtained by cooling from 100° C. to 25° C. at a cooling rate of 1° C./minute. By setting a cooling rate when the DC voltage is applied as the alignment treatment to be lower than a cooling rate when no voltage is applied, the liquid crystal can give a sufficient response to the electric field, and it is possible to perform the alignment treatment accurately and increase the cooling rate in a period in which the liquid crystal does not need to respond to an electric field, thereby shortening the cooling time. In Embodiment 3, by changing the cooling rate, it was possible to decrease a conventionally required cooling time of around 75 minutes to around 23 minutes and significantly shorten the cooling time.

Embodiment 4

In Embodiment 4, an evaluation cell was produced by introducing the liquid crystal of sample D into an evaluation empty cell similar to that of Embodiment 1, and the alignment treatment was performed. The cooling process of liquid crystal comprises, after heating the liquid crystal to the isotropic phase (80° C.) once, cooling the liquid crystal at a cooling rate of 10° C./minute, stopping the cooling for 3 minutes in a temperature range (67° C.) showing the cholesteric phase so as to change all the liquid crystals into the cholesteric phase, and then cooling the liquid crystal again to room temperature (25° C.) at a cooling rate of 10° C./minute. By stopping the cooling, a period in which the temperature (temperature during the cooling) is kept is provided within the temperature range showing the cholesteric phase, and therefore all the liquid crystals can certainly be changed into the cholesteric phase. The cooling rate when the cooling is stopped can be expressed as 0° C./minute, but the cooling rate may take other numerical value if it can provide a substantially stopped state, and the same effects can also be expected at a cooling rate of around 0.5° C./minute or less. Therefore, 0° C./minute mentioned here can include numerical values of around 0.5° C./minute or less. The alignment treatment was performed by application of a DC voltage of 3 V as an applied voltage to the liquid crystal within a temperature range of ±3° C. from transition temperature (64° C.) at which the liquid crystal changes from the cholesteric phase to the chiral smectic C phase (67 to 61° C.).

The alignment state obtained in Embodiment 4 was uniform alignment and thus good alignment. In Embodiment 1 (see FIG. 2), when the cooling rate was set at 10° C./minute, the sample D (corresponding to the one with the cholesteric phase temperature width of 7° C. in FIG. 2) could not obtain a state of uniform alignment due to the high cooling rate, resulting in poor alignment. However, even when the cooling process is performed at the same cooling rate for the same sample (the same cholesteric phase temperature width), if a cooling stop period (a period during which the cooling rate is 0° C./minute, i.e., a period during which the liquid crystal is kept at temperature showing the cholesteric phase) is provided within the temperature range showing the cholesteric phase, it is possible to perform the alignment treatment by certainly changing all the liquid crystals into the cholesteric phase, thereby improving the alignment state.

Embodiment 5

An empty panel having an electrode pattern configuration different from that in Embodiment 1 was produced by the same method as in Embodiment 1. The basic specifications of the electrode pattern configuration are 640×480 pixels and the electrode area of $6 \times 10^{-5}$ cm$^2$, and the size of the panel is 3.2 inches in diagonal. Besides, a TFT as a switching element was also formed in association with each pixel. An evaluation panel (liquid crystal display device) was produced by introducing the liquid crystal of sample F into an empty panel. The cooling process of liquid crystal comprises cooling the liquid crystal to room temperature (25° C.) at a fixed cooling rate of 3° C./minute after heating the liquid crystal to the isotropic phase (120° C.) once. The alignment treatment was performed by application of a DC voltage of 3 V, which was a sufficient voltage to obtain the effects of the alignment treatment, within a temperature range of ±3° C. from transition temperature (97° C.) at which the liquid crystal changes from the cholesteric phase to the chiral smectic C phase (100 to 94° C.). The resulting alignment state was uniform alignment and thus good alignment. The evaluation panel was sandwiched between two polarization films arranged in a crossed-Nicol state, and the average molecular axis LCMA in the absence of applied voltage was substantially aligned with the polarization axis of one of the polarization films to provide a dark state.

Figure 6:
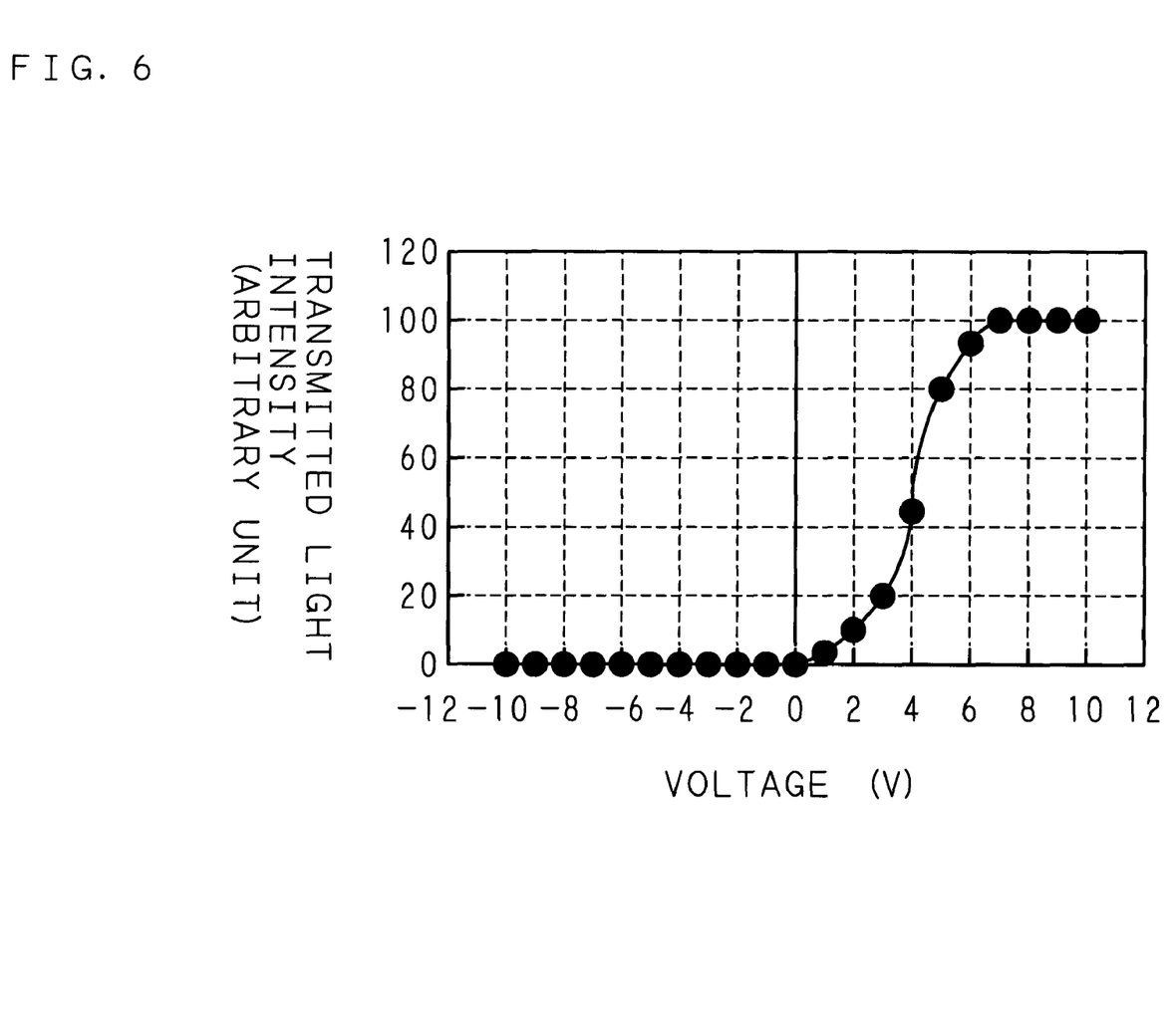
FIG. 6 is a graph showing the voltage-transmittance characteristic of a liquid crystal display device according to Embodiment 5.

FIG. 6 is a graph showing the voltage-transmittance characteristic of the liquid crystal display device according to Embodiment 5. The abscissa represents the voltage (V) applied through the TFT, while the ordinate represents a transmitted light intensity (in arbitrary unit) corresponding to the transmittance, and measurement was performed under the condition that a high transmittance (transmitted light intensity) was obtained with the application of a voltage of a first polarity (positive voltage). The transmitted light intensity indicated substantially zero with the application of a voltage of a second polarity (negative voltage), while the transmitted light intensity showed 100 with the application of 10V voltage of the first polarity, and the liquid crystal display device capable of providing a bright display was obtained.

Embodiment 6

Figure 7:
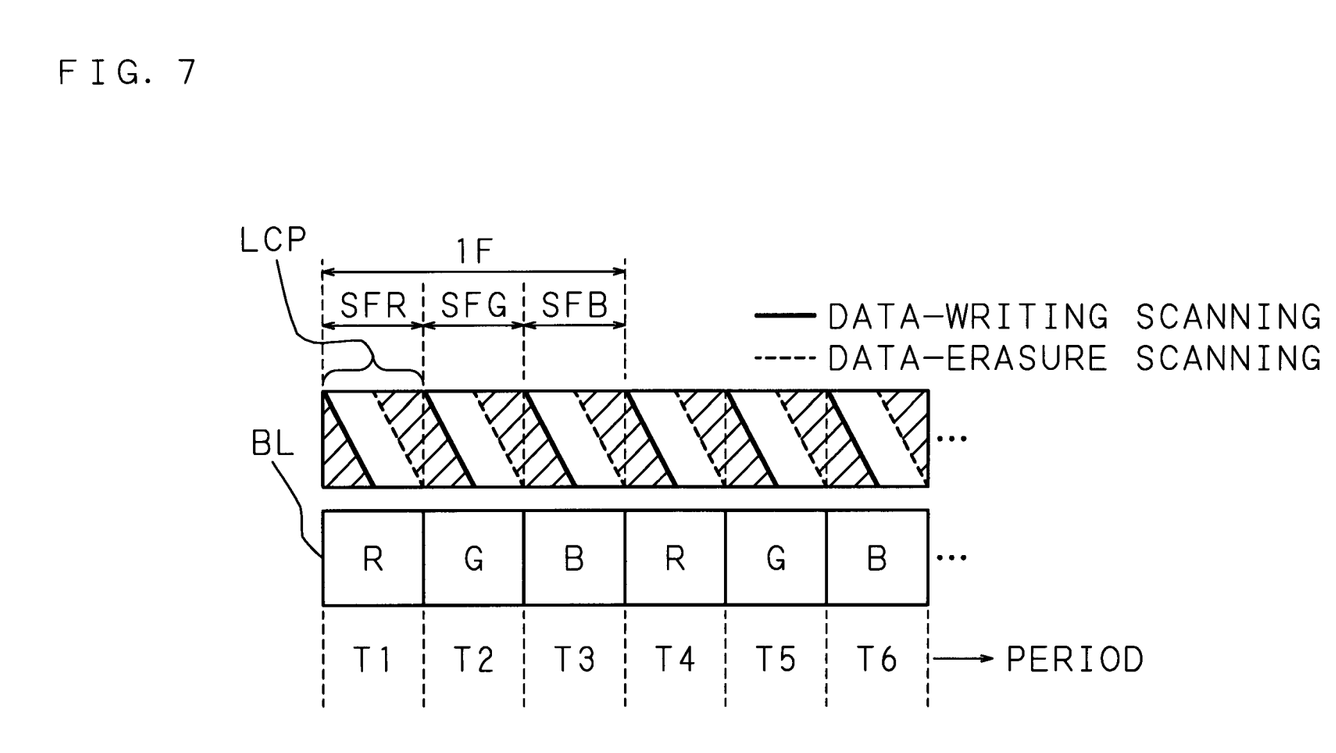
FIG. 7 is a concept view showing a drive sequence of a liquid crystal display device according to Embodiment 6.

FIG. 7 is a concept view showing a drive sequence of the liquid crystal display device according to Embodiment 6. A liquid crystal display device capable of being driven by a field-sequential color scheme was produced by combining a back-light BL capable of emitting light of red (R), green (G) and blue (B) in a time divided manner with a liquid crystal display panel LCP. The liquid crystal display panel LCP is the same as the evaluation panel of Embodiment 5. The back-light BL is driven by the field-sequential color scheme, and lights R (red), G (green) and B (blue) are emitted in a time divided manner in periods T1, T2, and T3, respectively. Sub-fields SFR, SFG and SFB are formed to correspond to the periods T1, T2, and T3. By displaying a red screen, a green screen, and a blue screen in the sub-fields SFA, SFG and SFB, respectively, and displaying a composite screen obtained by combining the screens of the respective colors in one field 1F (recognized as a composite screen obtained by the residual image effect of the vision of a human being), it is possible to provide a color display. The operation is repeated in and after periods T4, T5, and T6 in the same manner so as to provide a color display. Note that each of the periods T1, T2 and T3 is about 1/180 second or less, and one field 1F is about 1/60 minute or less. As the light source of the back-light BL, red, green and blue LEDs (light emitting diodes) were used because of easy adjustment of brightness and switching.

The applied voltage to the liquid crystal display panel LCP was set within a range of ±7 V from 0, and then data-writing scanning was performed with a positive polarity voltage and data-erasure scanning (erasure: black writing) was performed with a voltage having negative polarity and substantially equal magnitude as that used in the data-writing scanning. With a liquid crystal display device designed to apply a drive voltage by the field-sequential color scheme, it was possible to realize a liquid crystal display device having high quality such as a high contrast ratio, high brightness and high color purity display. Needless to say, the present invention is also applicable to color liquid crystal display devices using micro-color filters instead of the field-sequential color scheme.

As described in detail above, according to the present invention, in a monostable liquid crystal having spontaneous polarization, particularly ferroelectric liquid crystal, by setting the temperature range of the cholesteric phase (or chiral nematic phase) of the phase sequence of the liquid crystal to be 3° C. or more, it is possible to obtain a liquid crystal display device having uniform alignment of the liquid crystal, thereby providing a liquid crystal display device of good display quality.

According to the present invention, by specifying a processing method such as the cooling rate, applied voltage, and cooling sequence in the alignment treatment, it is possible to achieve an accurate alignment treatment and provide a manufacturing method of a liquid crystal display device having uniform alignment of the liquid crystal.

According to the present invention, since a liquid crystal display device having uniform alignment of the liquid crystal is driven by a field-sequential color scheme, it is possible to obtain a liquid crystal display device capable of providing a higher quality display.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A liquid crystal display device comprising two substrates sandwiching a liquid crystal having spontaneous polarization, and electrodes for applying a voltage to said liquid crystal, wherein said liquid crystal shows a monostable state in which an average molecular axis of a director of liquid crystal molecules is aligned in a single direction and present in a first position when no voltage is applied, shows a state in which the average molecular axis is tilted in one direction from the first position at an angle corresponding to a magnitude of a voltage of a first polarity and present in a second position when the voltage of the first polarity is applied, and shows either a state in which the average molecular axis maintains the first position or a state in which the average molecular axis is tilted in a direction opposite to said one direction from the first position and present in a third position when a voltage of a second polarity opposite to the voltage of the first polarity is applied, and a temperature range of either one of a cholesteric phase and a chiral nematic phase of a phase sequence of said liquid crystal, the phase sequence being either one of an isotropic phase—cholesteric phase—chiral smectic C phase and an isotropic phase—chiral nematic phase—chiral smectic C phase from a higher-temperature side, has a temperature width ranging between 3° C. and 24° C.

2. The liquid crystal display device of claim 1, wherein the temperature range of either one of the cholesteric phase and the chiral nematic phase of the phase sequence of said liquid crystal has a temperature width of not less than 5° C.

3. The liquid crystal display device of claim 2, wherein the temperature range of either one of the cholesteric phase and the chiral nematic phase of the phase sequence of said liquid crystal has a temperature width of not less than 10° C.

4. The liquid crystal display device of claim 3, wherein said liquid crystal is a ferroelectric liquid crystal.

5. The liquid crystal display device of claim 2, wherein said liquid crystal is a ferroelectric liquid crystal.

6. The liquid crystal display device of claim 1, wherein said liquid crystal is a ferroelectric liquid crystal.

7. The liquid crystal display device of claim 1, further comprising a back-light which is driven by a field-sequential color scheme, wherein a data-writing scanning voltage and a data-erasure scanning voltage are applied to said electrodes.

8. A manufacturing method of a liquid crystal display device comprising two substrates sandwiching a liquid crystal having spontaneous polarization, and electrodes for applying a voltage to said liquid crystal, wherein said liquid crystal shows a monostable state in which an average molecular axis of a director of liquid crystal molecules is aligned in a single direction and present in a first position when no voltage is applied, shows a state in which the average molecular axis is tilted in one direction from the first position at an angle corresponding to a magnitude of a voltage of a first polarity and present in a second position when the voltage of the first polarity is applied, and shows either a state in which the average molecular axis maintains the first position or a state in which the average molecular axis is tilted in a direction opposite to said one direction from the first position and present in a third position when a voltage of a second polarity opposite to the voltage of the first polarity is applied, and a temperature range of either one of a cholesteric phase and a chiral nematic phase of a phase sequence of said liquid crystal, the phase sequence being either one of an isotropic phase—cholesteric phase—chiral smectic C phase and an isotropic phase—chiral nematic phase—chiral smectic C phase from a higher-temperature side, has a temperature width of not less than 3° C., said manufacturing method comprising the steps of:

introducing said liquid crystal between said two substrates;

performing an alignment treatment to bring said liquid crystal into the monostable state by cooling said liquid crystal at a rate of 3 to 10° C./minute and by providing a period in which the temperature of said liquid crystal is kept within a temperature range showing either one of the cholesteric phase and the chiral nematic phase during cooling, after heating said liquid crystal to a temperature of the isotropic phase thereof.

9. The manufacturing method of a liquid crystal display device of claim 8, wherein the alignment treatment is performed after heating said liquid crystal to an isotropic phase.

10. The manufacturing method of a liquid crystal display device of claim 8, wherein during the period when said liquid crystal is kept within a temperature range showing either one of the cholesteric phase and the chiral nematic phase during cooling, the cooling of said liquid crystal is at a rate of 0.5° C./minute or less.

* * * * *